(12) United States Patent
Li et al.

(10) Patent No.: US 8,347,306 B2
(45) Date of Patent: Jan. 1, 2013

(54) METHOD AND SYSTEM FOR DETERMINING RESOURCE USAGE OF EACH TENANT IN A MULTI-TENANT ARCHITECTURE

(75) Inventors: Xin Hui Li, Beijing (CN); Ying Li, Beijing (CN); Tian Cheng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 12/540,429

(22) Filed: Aug. 13, 2009

(65) Prior Publication Data
US 2010/0049570 A1    Feb. 25, 2010

(30) Foreign Application Priority Data

Aug. 19, 2008   (CN) .......................... 2008 1 0130844

(51) Int. Cl.
*G06F 9/46*       (2006.01)
*G06F 15/173*   (2006.01)

(52) U.S. Cl. ........ 718/104; 718/107; 718/105; 709/224; 709/226

(58) Field of Classification Search ........................ None
See application file for complete search history.

(56) References Cited

U.S. PATENT DOCUMENTS

| | | | | |
|---|---|---|---|---|
| 6,597,907 B1 * | 7/2003 | Pruitt et al. | ................ | 455/423 |
| 7,702,779 B1 * | 4/2010 | Gupta et al. | ................. | 709/224 |
| 2007/0061450 A1 * | 3/2007 | Burnley et al. | ................ | 709/224 |
| 2009/0327482 A1 * | 12/2009 | Malhotra et al. | ................ | 709/224 |
| 2010/0198730 A1 * | 8/2010 | Ahmed et al. | .................. | 705/50 |

OTHER PUBLICATIONS software.techrepublic.com.com/abstract.aspx?docid=357889, "WinSAAS (zip)", 2008, 3 pages.
ieeexplore.ieee.org/Xplore/login.jsp?url=/iel5/4141733/4141734/04141736.pdf?isnumber=4141734&prod=CNF&arnumber=4141736&arSt=1&ared=6&arAuthor=Anerousis%2C+Nikos%3B+Mohi, "The software-as-a Service Model for mobile and Ubiquitous computing Environments", IEEE 2006, 6 pages.
download.microsoft.com/download/b/a/d/bad    16d3e-052f-4e29-83ed-56d05311e9f4/saas.ppt, "Software as a service", 2006, 31 pages.
Roush, "EMC Gets Serious About Software-as-a-Service—Forms New Business Unit and Launches Enterprise Version of Mozy Online Backup," Jan. 22, 2008, web.archive.org/web/20090211211740/http://www.xconomy.com, 4 pages.

(Continued)

*Primary Examiner* — Jennifer To
*Assistant Examiner* — Abdullah Al Kawsar
(74) *Attorney, Agent, or Firm* — Jeffrey N. Giunta; Fleit Gibbons Gutman Bongini & Bianco PL

(57) ABSTRACT

A computer implemented method and system for determining resource usage of a tenant in a multi-tenant architecture. The method includes the steps of: recording, within predetermined time intervals, total consumption of each resource in each predetermined time interval; obtaining total times of calling each operation by each tenant in each predetermined time interval; calculating consumption of each resource during each operation based on the total times and the total consumption obtained within the period of time; and calculating usage of each resource by each tenant within the period of time based on the calculated consumption of each resource during each operation and the total times of calling each operation of each tenant in each predetermined time interval. The system includes apparatus for performing the above method.

20 Claims, 7 Drawing Sheets

OTHER PUBLICATIONS

Venkatesh, M.R., et al., "Taming the SaaS Delivery Channel," Agora IP Group ATG Technical Research, copyright Jul. 2008 HCL Technologies Ltd., 12 pages.
Parallels Software as a Service (SaaS) Datasheet, "SaaS Benefits and Strategies for Service Providers," Parallels, Jul. 29, 2008, 2 pages.
Parallels Software as a Service (SaaS) Datasheet, "SaaS Benefits and Strategies for ISVs," Parallels, Jul. 29, 2008, 2 pages.
Parallels Software as a Service (SaaS) Datasheet, "ISVs—Deliver SaaS Through Hosting Service Providers," Parallels, Jul. 29, 2008, 2 pages.
HCL Integrated Services, Software, Infrastructure and BPO, "SaaS—Software as a Service," web.archive.org/web/20090417233357/hcltech.com/SaaS, 2008 HCL Technologies Limited, 3 pages.

* cited by examiner

METHOD AND SYSTEM FOR DETERMINING RESOURCE USAGE OF EACH TENANT IN A MULTI-TENANT ARCHITECTURE

CROSS REFERENCE TO RELATED APPLICATION

This application claims priority under 35 U.S.C. 119 from Chinese Patent Application 200810130844.2, filed Aug. 19, 2008, the entire contents of which are incorporated herein by reference.

BACKGROUND OF THE INVENTION

1. Field of the Invention

The present invention relates to a multi-tenant architecture. More particularly, the present invention relates to a method and system for determining resource usage of each tenant in a multi-tenant architecture.

2. Description of Related Art

Soft as a Service (SaaS) is an emerging software delivery model. Different from the traditional software delivery model, SaaS provides services on line, which frees users from installation, upgrading and maintenance, and enables users to access via the Internet anytime and anywhere. In addition, compared with traditional software delivery models, users can enjoy good services with low monthly payments.

The SaaS application is typically based on a multi-tenant architecture. FIGS. 1a to 1e schematically show several kinds of multi-tenant architecture in the process of multi-tenant architecture development.

FIG. 1(a) shows a block diagram of level-1 multi-tenant architecture, wherein different tenants exclusively occupy different instances, each instance being customized to one tenant. However, since each instance serving each tenant is unique, the operation cost of service providers is huge. FIG. 1 (b) shows a block diagram of a level-2 multi-tenant architecture, wherein instances serving different tenants are identical. However, it is wasteful or each tenant to be provided exclusively with a same instance when the application scale is not very large. Therefore, in a level-3 multi-tenant architecture, as shown in FIG. 1 (c), different tenants share a same instance. However, if the number of tenants increases, it will be necessary to balance the load, thus the level-3 multi-tenant architecture can not satisfy the service requirement. To this end, in a level-4 multi-tenant architecture, as shown in FIG. 1 (d), a tenant load balancer is used to prioritize the processing of service requests based on tenants' priorities, so as to realize load balance.

With further expansion of the application scale, the level-4 multi-tenant architecture can not satisfy the increasing tenant's demands any more. There is also a level-5 multi-tenant architecture. As shown in FIG. 1 (e), in the level-5 multi-tenant architecture, multiple tenants share a plurality of same instances under the management of a tenant load balancer. The tenant load balancer may allocate tenants' service requests to each instance based on the computing capacity, load of the device where each instance resides and/or the priorities of tenants, such that services are provided to the tenants by each instance. In the level-5 multi-tenant architecture, a logic storage is provided for multiple instances to share, so as to store data required to share by multiple instances.

In a multi-tenant architecture, billing is an important issue. In the level-5 multi-tenant architecture, two billing manners are often adopted. One is a fixed monthly rental, i.e. charging the same price for all tenants subscribing to the services. Although resource usages of different tenants vary, under this billing manner, all tenants are charged with the same payment, thus it is a manner that is simple but unfair. Another manner is to charge by time, which reflects fairness to a certain extent, but the basis for billing is the on-line time of a tenant. Besides, services provided by a service provider contain a large number of functions, but the functions needed by each tenant are different. In addition, the operation times of each tenant regarding the same function usually are different, and even the resources consumed by operations of the same function are also different. Therefore, a fairer billing manner is to bill based on the resource usage of each tenant. However, it is impossible to obtain the resource usage of each tenant according to the prior art.

SUMMARY OF THE INVENTION

According to a first aspect of the present invention, a computer implemented method is provided for determining resource usage of a tenant in a multi-tenant architecture. The method includes the computer implemented steps of: recording, within a period of time that includes a plurality of predetermined time intervals, total consumption of each resource in each predetermined time interval; obtaining total times each operation is called by each tenant in each predetermined time interval; calculating consumption of each resource during each operation based on a plurality of the total times and a plurality of the total consumption obtained within the period of time; and calculating usage of each resource by at least one tenant within the period of time, based on the calculated consumption of each resource during each operation and the total times of calling each operation of each tenant in each predetermined time interval, thus determining resource usage for the at least one tenant.

According to a second aspect of the present invention a system is provided for determining resource usage of a tenant in a multi-tenant architecture. The system includes: a resource total consumption recorder for recording, within a period of time comprising a plurality of predetermined time intervals, total consumption of each resource in each predetermined time interval; an operation tracker for obtaining total times of calling each operation of each tenant in each predetermined time interval; an operation consumption calculator for calculating consumption of each resource during each operation based on a plurality of the total times and a plurality of the total consumption obtained within the period of time; and a resource usage calculator for calculating usage of each resource of at least one tenant within the period of time, based on the calculated consumption of each resource during each operation and the total times of calling each operation of each tenant in each predetermined time interval.

BRIEF DESCRIPTION OF THE DRAWINGS

The foregoing and further features of the present invention will become more apparent from the following detailed description of preferred embodiments described with reference to the accompanying drawings, wherein the same numerals represent the same or similar parts, and wherein.

DESCRIPTION OF THE PREFERRED EMBODIMENTS

Hereinafter, a more detailed description will first be given to a method for determining resource usage of each tenant in a multi-tenant architecture as provided in the present invention with reference to the accompanying drawings by way of embodiments.

Figure 1:
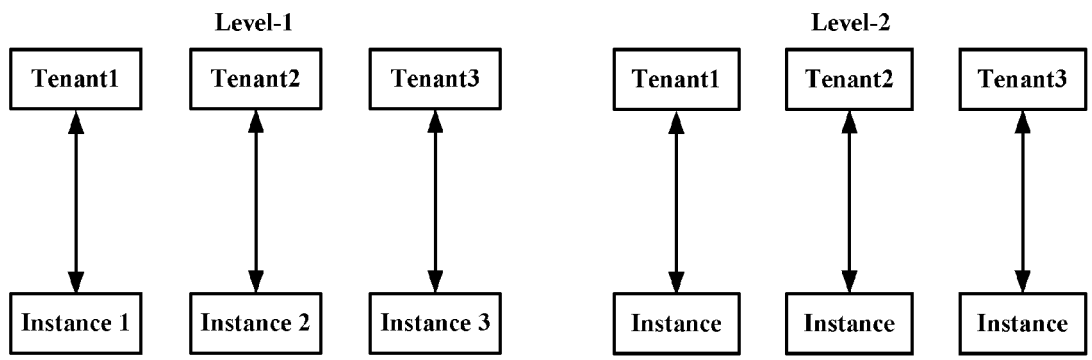
FIGS. 1a to 1e schematically show block diagrams of level-1 through level-5 multi-tenant architectures.
Figures 1C, 1D:
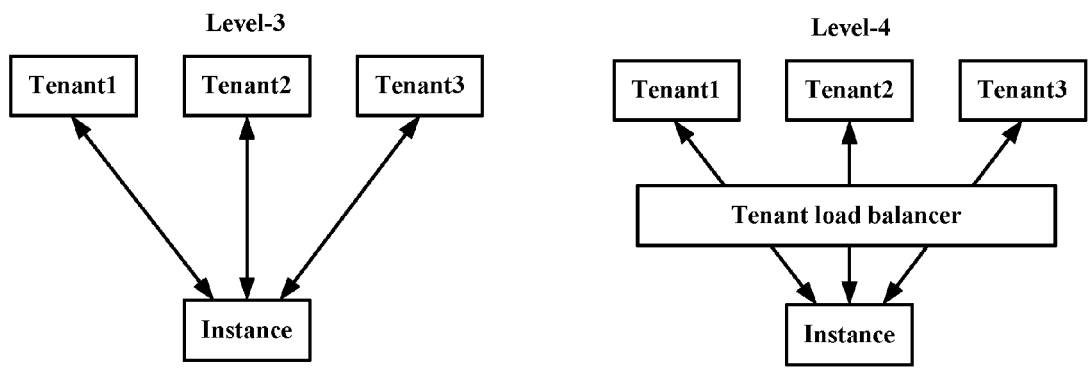
Figure 1E:
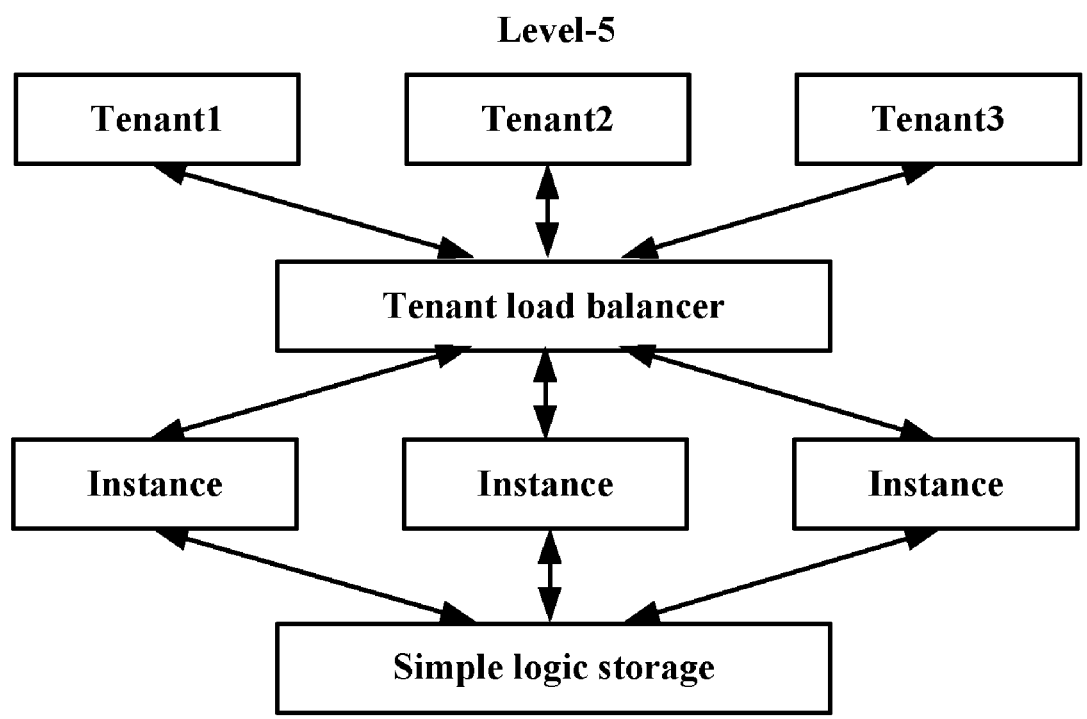
Figure 2:
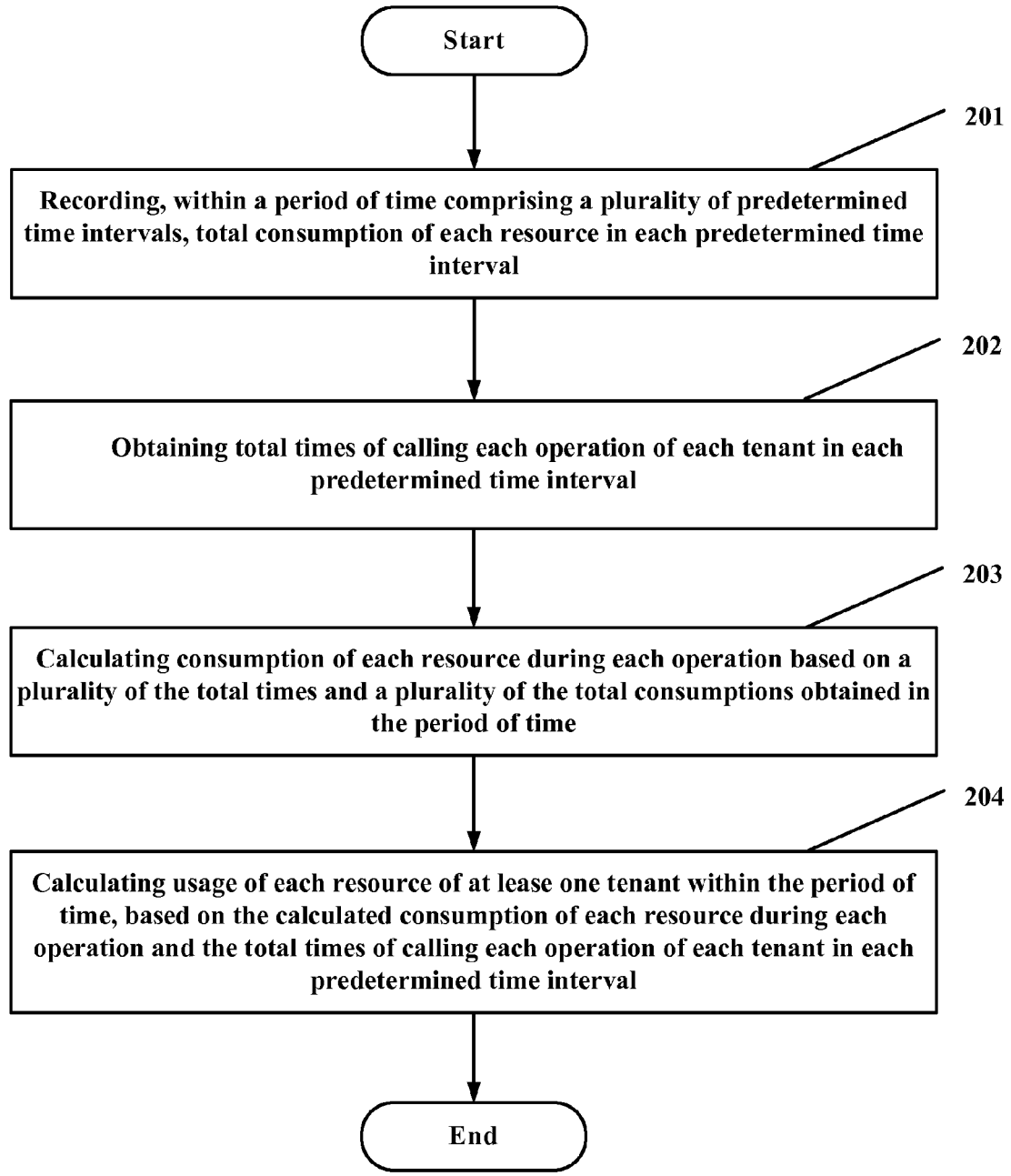
FIG. 2 is a flow chart of a method for determining resource usage of each tenant according to an embodiment of the present invention.

Referring to FIG. 2, the flow chart shows a method for determining resource usage of each tenant according to an embodiment of the present invention, especially a method for calculating resource usage of each tenant by means of statistics. For the sake of convenient description, it is provided that: a period of time for example lasting several hours is divided into a plurality of predetermined time intervals $T_1, T_2, \ldots T_n$; in the multi-tenant architecture, the number of tenants is m, i.e. there are tenant 1, tenant 2, ..., and tenant m; the number of operations provided by a service (corresponding to the functions provided by the service) is assumed as p, i.e. the service in total includes operations $O_1, O_2, \ldots, O_p$.

As shown in FIG. 2, at step 201, total consumption of each resource in each predetermined time interval is recorded within a period of time including a plurality of predetermined time intervals.

In each time interval $T_1$ through $T_n$, total consumption of each resource is recorded. Resources whose total consumption is required to record may include a CPU (Central Processor Unit), a memory, and etc. Hereinafter, description is made with a CPU and a memory as examples, but the present invention is not limited thereto. The total consumption of the CPU and the memory during each time interval may be obtained respectively by monitoring the CPU and the memory. The total consumption of the CPU resource in each predetermined time interval $T_1, T_2, \ldots T_n$ may be indicated by cycle numbers $c_1, c_2, \ldots, c_n$, etc; and total consumption of the memory in each predetermined time interval $T_1, T_2, \ldots, T_n$ may be indicated by byte numbers $b_1, b_2, \ldots, b_n$.

Next, at step 202, the total times of calling each operation of each tenant in each predetermined time interval are obtained.

In the existing multi-tenant architecture, a tenant typically receives services through a network protocol such as HTTP (Hypertext Transfer Protocol). In this scenario, information associated with calling each operation by each tenant is typically recorded in a network log such as HTTP log. Thus, through accessing the HTTP log and based on information associated with calling each operation by the tenant in each predetermined time interval in the HTTP log, it is able to obtain total times $N_{ijk}$ (wherein i=1 through n, j=1 through m, and k=1 through p) of calling each operation $O_1, O_2, \ldots, O_p$ by each tenant, i.e. tenant 1, tenant 2, ..., and tenant m, in each predetermined time interval $T_1, T_2, \ldots, T_n$. For example, total times $N_{ijk}$ of the tenant j accessing each operation $Q_k$ during the predetermined time interval $T_i$ may be obtained by making statistics of the information in the HTTP log with the start time and end time of a predetermined time interval, a tenant identification (ID) and an operation ID.

However, the present invention is not limited thereto. Total times $N_{ijk}$ of the tenant j accessing the operation $O_k$ during the predetermined time interval $T_i$ may also be obtained in a real-time manner.

In the prior art, the core layer of JVM (Java Virtual Machine) does not know which tenant the current operation is directed against. But in the application layer, the information is obtainable. As known to the skilled in the art, a tenant will enter his own ID when logging on, and a service request sent by the tenant also includes the tenant ID, thus the tenant ID may be obtained from the request. Therefore, it is feasible to take measures to transmit the information from the application layer to the JVM core layer.

Figure 3:
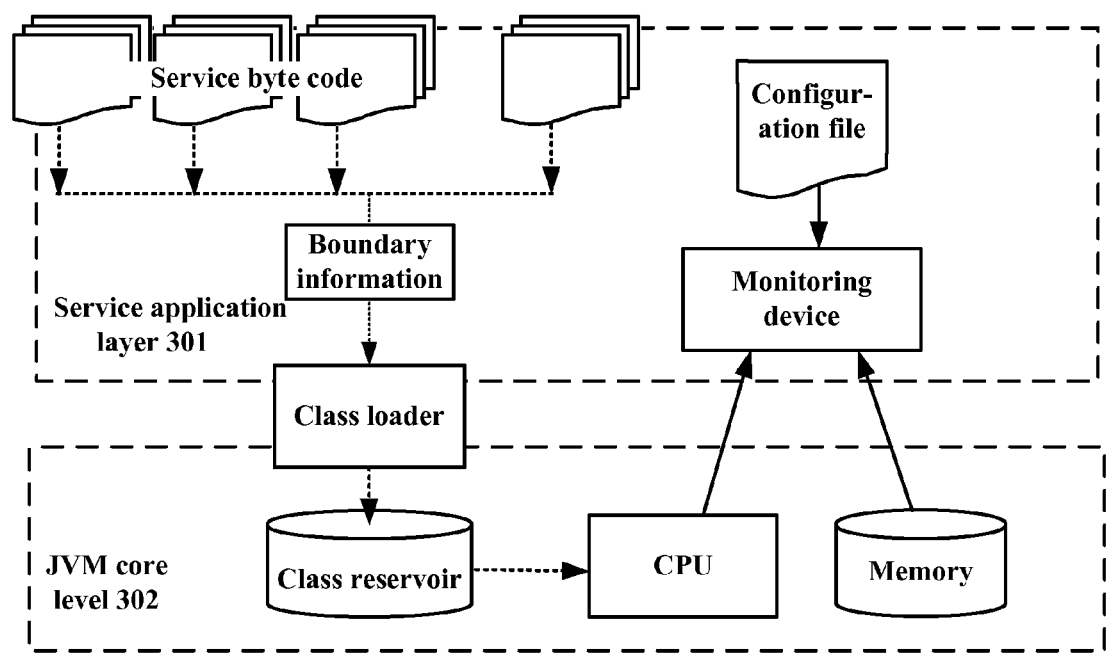
FIG. 3 is a process diagram for a method for obtaining a tenant ID corresponding to an operation according to an embodiment of the present invention.

In one preferred embodiment, the tenant ID corresponding to an operation may be obtained when the operation is about to start, and then the total times of calling the operation by the tenant in the predetermined time interval is increased by 1. FIG. 3 shows a method for obtaining a tenant ID corresponding to an operation according to an embodiment of the present invention. In this embodiment, a specific storage location dedicated to storing the tenant ID is set at the core level of the JVM. After the tenant's ID contained in the service request is obtained, it is written into the specific storage location for replacing the tenant's ID as previously stored. Alternatively, the obtained information regarding the tenant's ID may be stored in the configuration file at the application layer.

In this embodiment, when an operation-to-start event is captured through monitoring a context, a class file in which boundary information which indicates the operation-to-start event are added, may be loaded to the JVM core layer by a class loader. After the class file is loaded to a class reservoir and when a action statement of the boundary information regarding a service-to-start event is executed, message will be triggered such that a monitoring device monitoring the JVM core layer may know the timing for obtaining the tenant ID, and then, in response to the service-to-start event, the tenant ID may be obtained from a predetermined memory location or configuration file.

In another preferred embodiment, when an operation-to-start event is captured, the obtained tenant ID may be directly written into a class file, and then the class file is loaded to the JVM core layer. The device monitoring the JVM core layer may monitor and obtain the operation-to-start event, and then read the tenant ID in the class file.

After the tenant's ID corresponding to the operation which is to start is obtained, the times of calling the operation by the tenant during the predetermined time interval may be increased by 1, for example, at the start of the operation, at the end of the operation or at any time during the operation. In this manner, the total times of calling each operation of each tenant in each predetermined time interval may also be obtained.

Then, at step 203, the consumption of each resource during each operation is calculated based on a plurality of the total times and a plurality of the total consumption obtained within the period of time. The total times:

$$O_{ik} = \sum_{j=1}^{m} O_{ijk}$$

of calling the operation $O_k$ in each predetermined time interval $T_i$ may be obtained based on the total times $N_{ijk}$ of accessing each operation $O_k$ by each tenant j in each predetermined time interval $T_i$ as obtained at step 202. In addition, the memory resource and the CPU resource which are consumed by each operation $O_k$ (k=1 through p) within the period of time are respectively assumed as unknown numbers x1, x2, ..., xp and unknown numbers y1, y2, ..., yp. Thus, as for the memory resource consumption, the following n equations E1 through En may be obtained based on the above data:

$$T1: O11 \times x1 + O12 \times x2 +, \ldots, O1p \times xp = b1 \quad \text{Equation E1}$$

$$T2: O21 \times x1 + O22 \times x2 +, \ldots, O2p \times xp = b2 \quad \text{Equation E2}$$

$$\ldots$$

$$Tn: On1 \times x1 + On2 \times x2 +, \ldots, Onp \times xp = bn \quad \text{Equation En}$$

In the above equations, there are p unknowns, i.e. x1, x2, ..., xp. Thus, a matrix equation may be constructed by taking out for example equations E1 to Ep from the above n equations:

$$Ox=b \quad \text{equation (1)}$$

Wherein, for example, $$O = \begin{bmatrix} O11 & O12 & \ldots & O1p \\ O21 & O22 & \ldots & O2p \\ \ldots & \ldots & & \ldots \\ Op1 & Op2 & \ldots & Opp \end{bmatrix}, \quad x = \begin{bmatrix} x1 \\ x2 \\ \ldots \\ xp \end{bmatrix}, \quad b = \begin{bmatrix} b1 \\ b2 \\ \ldots \\ bp \end{bmatrix}$$

An augmented matrix may be obtained based on the above equation:

$$Ob = \begin{bmatrix} O11 & O12 & \ldots & O1p & b1 \\ O21 & O22 & \ldots & O2p & b2 \\ \ldots & \ldots & & \ldots \\ Op1 & Op2 & \ldots & Opp & bp \end{bmatrix}$$

As to the above matrix equation, if RANK (O)=RANK (Ob), it may work out that $x = O^- b$.

For CPU, the following equations may be obtained likewise:

$$T1: O11 \times y1 + O12 \times y2 +, \ldots, O1p \times yp = c1 \quad \text{Equation E1}'$$

$$T2: O21 \times y1 + O22 \times y2 +, \ldots, O2p \times yp = c2 \quad \text{Equation E2}'$$

$$\ldots$$

$$Tn: On1 \times y1 + On2 \times y2 +, \ldots, Onp \times yp = cn \quad \text{Equation En}'$$

In the above equations, there are likewise p unknowns, i.e. y1, y2, ..., yp. Thus, a matrix equation may be constructed by taking out for example equations E1' to Ep' from the above n equations:

$$Oy=c \quad \text{equation (1')}$$

where:

$$O = \begin{bmatrix} O11 & O12 & \ldots & O1p \\ O21 & O22 & \ldots & O2p \\ \ldots & \ldots & & \ldots \\ Op1 & Op2 & \ldots & Opp \end{bmatrix}, \quad y = \begin{bmatrix} y1 \\ y2 \\ \ldots \\ yp \end{bmatrix}, \quad c = \begin{bmatrix} c1 \\ c2 \\ \ldots \\ cp \end{bmatrix}$$

An augmented matrix may be obtained based on the above equation:

$$Oc = \begin{bmatrix} O11 & O12 & \ldots & O1p & c1 \\ O21 & O22 & \ldots & O2p & c2 \\ \ldots & \ldots & & \ldots \\ Op1 & Op2 & \ldots & Opp & cp \end{bmatrix}$$

As to the above matrix equation, if RANK (O)=RANK (Oc), it may work out that $y = O^- c$.

The consumption of each resource for each operation, which is worked out based on equation (1) and equation (1'), may be taken as the total consumption of each operation within the whole period of time, but the present invention is not limited to this.

More results may further be worked out based on the above equations E1 through En and E1' through En' corresponding to the time intervals T1-Tn. For example, for the memory resource, n−P+1 results may be worked out respectively by using equations constituted by equations E2 through Ep+1, E3 through Ep+2, ... and En−p+1 through En, and thereby a plurality of resource usages may be worked out for selection.

Further, it should be noted that, for example for the above equation (1), there possibly are one or more reducible equations among equations E1 through Ep which constitute the equation (1). In this case, not all the values of x1 to xp can be worked out, and the results to get might only be relation expressions. Now, the results obtained from E1 to Ep may be disregarded, while the equations constituted by for example equations E2 to Ep+1 are further worked out. Alternatively, the relation expression worked out from equation (1) and the equation Ep+1 constitute a new equation so as to work out the value of each of x1 to xp, and the process may be repeated till working out all the values of x1 to xp. It should be noted that the above method is also applicable to calculate the CPU resource consumed by each operation.

Next, at step 204, usage of each resource of each tenant within the period of time is calculated, based on the calculated consumption of each resource during each operation and the total times of calling each operation of each tenant in each predetermined time interval.

After step 202, the total times $O_{ijk}$ of calling each operation $Q_k$ by each tenant j during each predetermined time cycle $T_i$ has been determined and the memory resource $x_k$ (wherein k=1 through p) consumed by each operation has been obtained. Therefore, the memory resource $b_{ij}$ (where i=1 through n, j=1 through m) consumed by tenant j in each predetermined time interval may be obtained by multiplying the total times $Q_{ijk}$ respectively by the resource $x_k$ consumed by each operation, i.e.:

$$b_{ij} = \sum_{k=1}^{p} O_{ijk} \times xk.$$

Likewise, the CPU resource $c_{ij}$ (wherein i=1 through n, j=1 through m) consumed by tenant j in each predetermined time interval may be obtained by multiplying the total times $Q_{ijk}$ respectively by the CPU resource yk consumed by each operation, i.e.:

$$c_{ij} = \sum_{k=1}^{p} O_{ijk} \times yk.$$

The usage of each resource of each tenant j in each predetermined time interval $T_i$ may be obtained by dividing the total resources $b_{ij}$ and $c_{ij}$ consumed in each predetermined time interval respectively by the total resources $b_i$ and $c_i$ consumed during the predetermined time interval.

By the above method, resource consumption rate of each resource of each tenant may be worked out. From the above description, it can be seen that the method is based on such assumption that different resources are consumed by different operations. However, in fact, the resources consumed by different tenants for the same operation are typically also different. For example, for a browsing operation, a tenant possibly needs to browse only a few pieces of information, while another tenant may need to browse extensive pieces of information. Thus, for a more accurate calculation, the resource usage of each tenant may be further calculated based on such assumption that resource consumptions of different tenants are different during the period of time. Based on the method described above, consumption of each operation of each tenant may be worked out. However, what's different in this scenario is that since the operation number provided by each service is p and the number of tenants is m, the number of the unknown numbers is p×m, the data obtained during the p×m time intervals are needed to constitute a matrix equation, so as to work out the p×m unknown numbers. However, it is only a variation of the present invention and is still included within the scope of the present invention.

Hereinafter, reference is made to FIG. 4 to describe the method of determining resource usage of each tenant. The method is a method for determining usage of each resource of each tenant more accurately through a real-time measurement, which is different from the method shown in FIG. 2.

First, at step 401, when an operation is about to start, the tenant ID corresponding to the operation is obtained.

As mentioned above, in the prior art, at the core layer of the Java Virtual Machine, it is unknown which tenant the current operation is directed against. But in the application layer, the information is obtainable. Therefore, it is able to transmit the information from the application layer to the JVM core layer. In the above description with reference to step 202, a plurality of embodiments obtaining the tenant ID corresponding to the operation have been described. Therefore, detailed description thereof is omitted here.

Next, at step 402, consumption of each resource during each operation is monitored.

The total consumption of each resource during each operation is measured through monitoring a resource consumption event. In an embodiment, upon detecting the resource consumption event, it is instructed to start measuring resource consumption of each resource, and upon the end of the resource consumption event, it is instructed to take out the measured resource consumption value. Each resource consumption is required to measure in a different manner, which may be implemented using a known manner in the prior art.

Next, at step 403, the mapping of the consumption of each resource during each operation to the tenant ID is established.

After the total consumption of each resource during each operation is obtained, it may be associated with the tenant, i.e. establishing the mapping of the consumption of the each resource during each operation to the tenant ID.

Next, at step 404, the usage of each resource of each tenant is determined based on the mapping.

After the above mapping is obtained, the mapping is searched by utilizing the tenant ID, the start and end time of the period of time and the resource type, thereby obtaining a more accurate consumption x and y of each resource of each tenant j. Further, resource usage of each resource of each tenant is obtained based on consumption of each resource of each tenant and total consumption of each resource.

Figure 4:
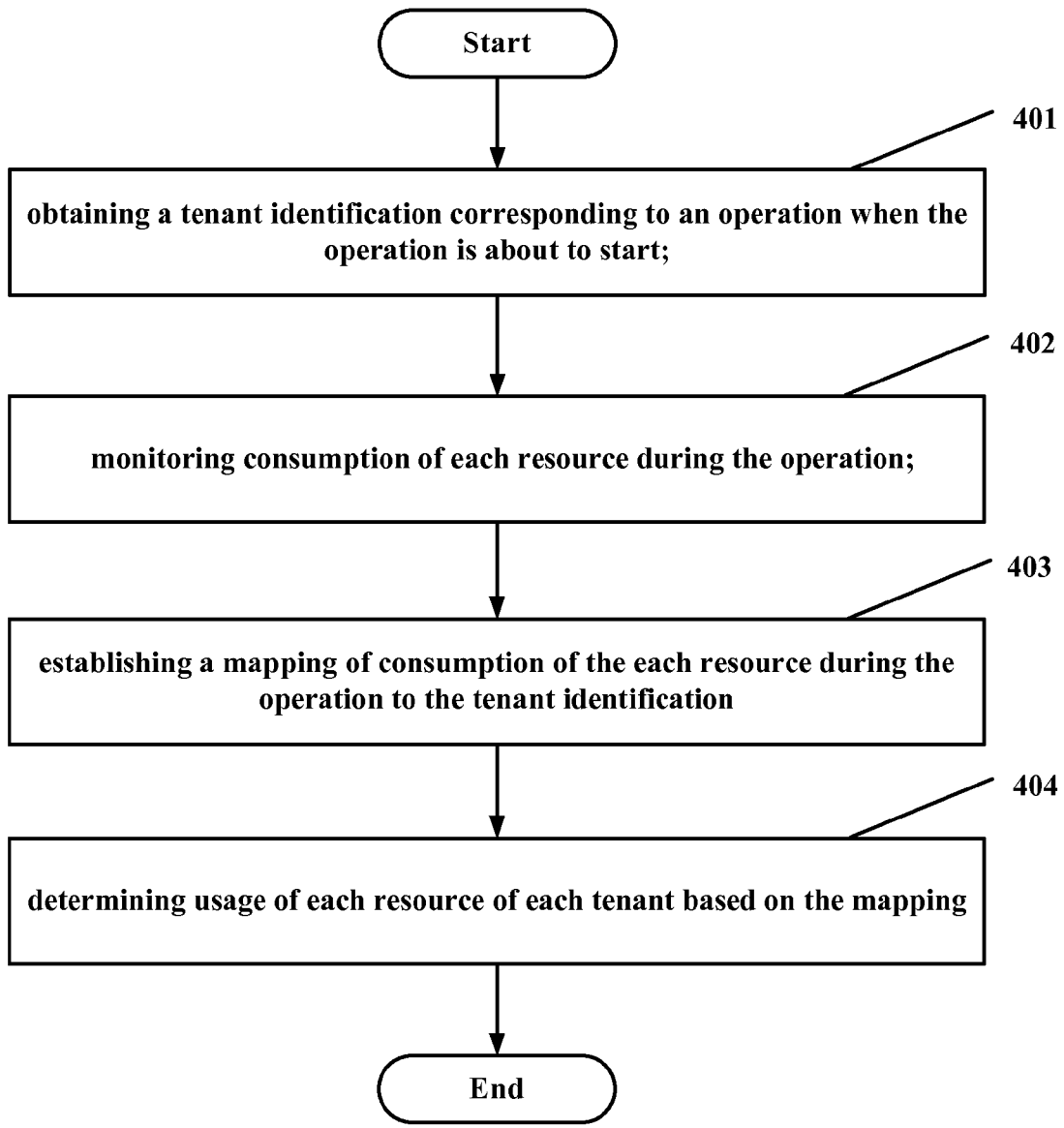
FIG. 4 schematically shows a flow chart of a method for determining resource usage of each tenant according to another embodiment of the present invention.

Thus, compared with the method as previously described with reference to FIG. 2, the method shown in FIG. 4 is more accurate, but it needs consuming more resources. Thus, preferably, only when the resource jitter exceeds the predetermined threshold, is the method of FIG. 4 implemented.

In one preferred embodiment, the predetermined threshold is a ratio, which may be set based on the empirical value, for example 5%. Here, the resource jitter is an error rate e between the x value obtained at this time and the x' value obtained at the previous time. For example, if the error $e_k$ of the operation Ok is: ek=xk−xk'/(xk) (k=1, . . . p, wherein p represents the number of operation), the error rate e may be:

$$e = \frac{1}{k}\sum_{k=1}^{p} e_k, \quad e = \frac{1}{k}\sum_{k=1}^{p} |e_k|, \quad e = \frac{1}{k}\sqrt{\sum_{k=1}^{p} e_k^2}, \text{ etc.}$$

Then, whether to implement the operation of accurate mode in the subsequent time interval can be determined based on the value e and the set predetermined threshold value.

In another embodiment, the predetermined threshold is a difference from historical resource consumption, which may be set based on the historical resource consumption. In the embodiment, the resource jitter may be an error value e' between xk or yk obtained at this time and xk' or yk' obtained at the previous time. For example, as to the memory resource, if the error ek' of the operation k is: ek'=xk−xk' (k=1, . . . p, wherein p represents the number of operation), the error value e' may be:

$$e' = \frac{1}{k}\sum_{k=1}^{p} e'_k, \quad e' = \frac{1}{k}\sum_{k=1}^{p} |e'_k|, \quad e' = \frac{1}{k}\sqrt{\sum_{k=1}^{p} e_k'^2}, \text{ etc.}$$

Thus, whether to execute the operation of the accurate mode in the subsequent time interval can be determined based on the value e' and the set predetermined threshold value.

It should be noted that, in the above embodiment regarding resource jitter, the resource consumption xk and xk' of each operation may be the resource consumption obtained through statistics or the resource consumption obtained through accurate measurement. Further, if accurate measurement of resource usage is desired, the statistics may be implemented simultaneously. In this way, the error between the resource usages obtained by statistics and in the accurate mode in the same predetermined time interval may be determined, for example, the error rate and the difference, and etc, and then whether to adopt the accurate mode in the subsequent time interval may be further determined based on the error. For the sake of simplification, the jitter of the resource consumption may also be the jitter of the total resource consumptions worked out at the previous time and at the current time.

Preferably, the method of the present invention may further include determining the comprehensive usage of each resource of each tenant during the time period, based on the calculated usage of each resource of each tenant within the period of time, the usage of each resource of each tenant determined in the accurate mode, and the jitter. At this step, whether to use the usage calculated by statistics or use the usage measured in the accurate mode may be determined based on the jitter value. Next, the maximal one, the minimal one, the latest one, and the average resource usage and the weighted average usage within the period of time among the selected usages may be determined as the resource usages of each tenant within the time period based on a predetermined policy. It should be noted that the comprehensive value (such as average value and weighted average value, etc) of the resource usage obtained by statistics and the resource usage obtained by accurate measurement may also be determined as the resource usage within the period of time.

Preferably, the method of the present invention may further include the step of using the obtained resource usage of each tenant.

In an embodiment, the obtained resource usage may be used for billing. For example, for each type of resource usage for example a CPU and a memory, the price of unit usage may be designated, and then the fee paid monthly by a tenant is determined based on usage of each resource of each tenant. The resource usage as the basis for billing may be one or more of: the usage of each resource of each tenant within the period of time, calculated based on statistics; the usage of each resource of each tenant determined in an accurate mode; and the comprehensive usage of each resource of each tenant.

In another embodiment, the obtained resource usage may be used for tenant load balance. Since the resource usage of the present invention corresponds to the tenant, the present invention is operative to perform the load adjustment for the tenants, which is different from the prior art. For example, a tenant with a larger resource usage may be assigned to an instance residing in a computing device having a stronger computing capability, or a new instance is opened for the tenant. The resource usage as the basis for load adjustment may be one or more of: the usage of each resource of each tenant within the period of time, calculated based on statistics; the usage of each resource of each tenant determined in an accurate mode; and the comprehensive usage of each resource of each tenant.

It should be noted that the embodiment of the method of FIG. 4 is implemented only when the jitter of the total resource consumption exceeds a predetermined threshold as described above, but the present invention is not limited thereto. The method of FIG. 4 may be implemented as a method for independently determining the resource usage of each tenant.

Figure 5:
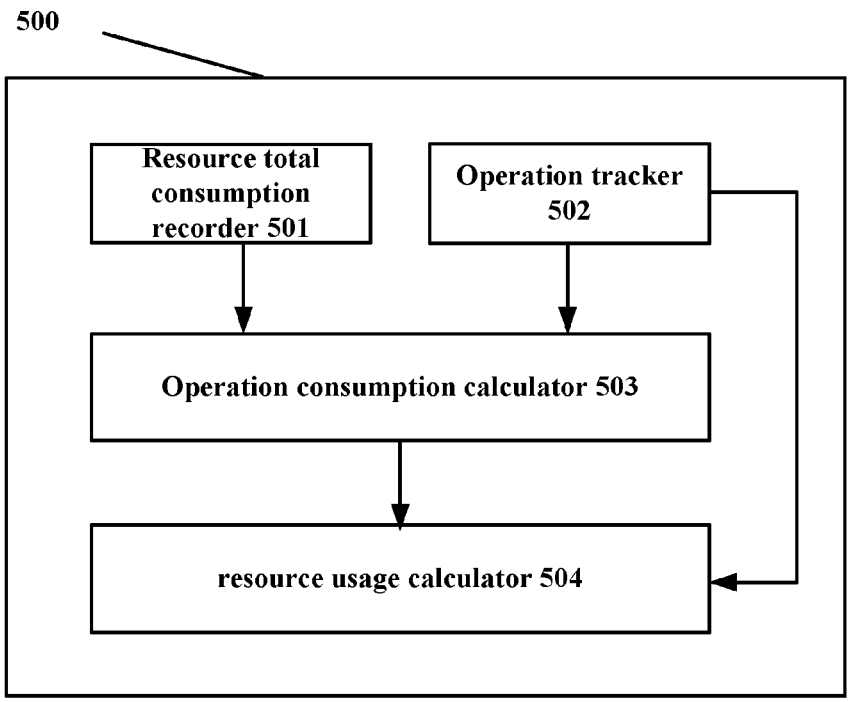
FIG. 5 is a block diagram of a system for determining resource usage for each tenant according to an embodiment of the present invention.
Figure 6:
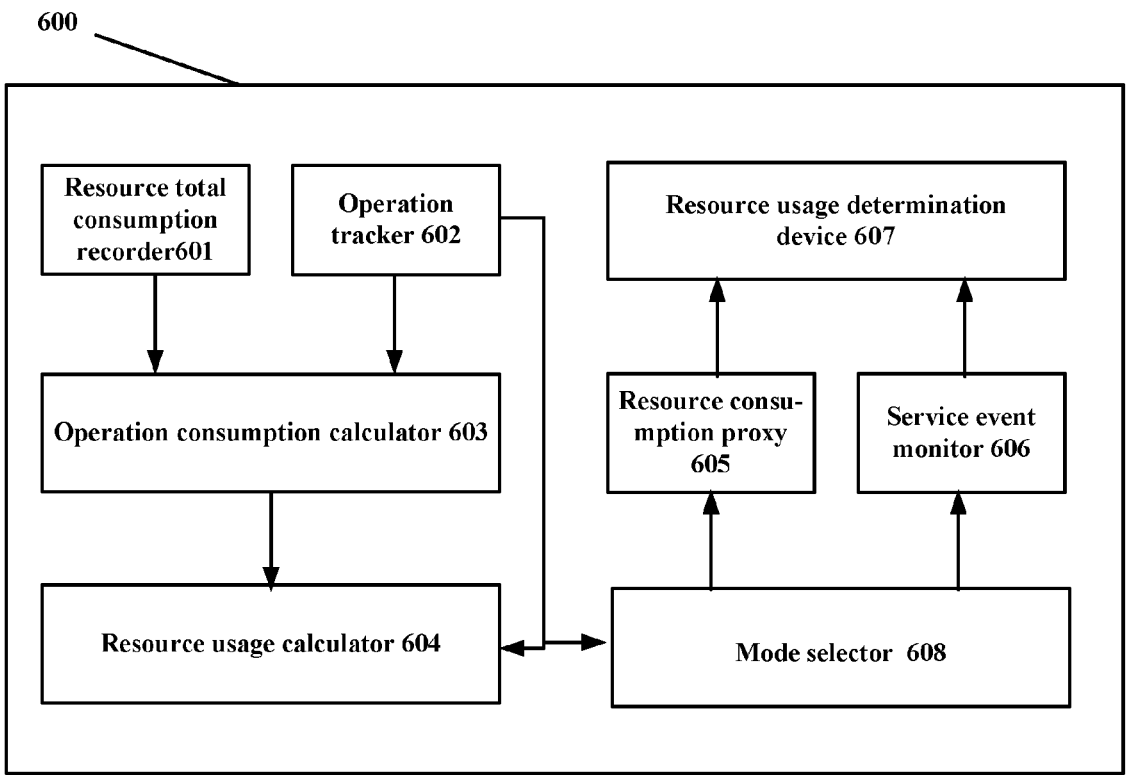
FIG. 6 is a block diagram of a system for determining resource usage of each tenant according to another embodiment of the present invention.

Reference is now made to FIGS. 5-6 to describe in detail a system for determining the resource usage of each tenant according to an embodiment of the present invention.

FIG. 5 shows a system for determining resource usage of each tenant according to an embodiment of the present invention. As shown in FIG. 5, the system 500 includes a resource total consumption recorder 501, an operation tracker 502, an operation consumption calculator 503 and a resource usage calculator 504.

The resource total consumption recorder 501 is for recording, within a period of time including a plurality of predetermined time intervals, total consumption of each resource in each predetermined time interval; the operation tracker 502 for obtaining total times of calling each operation of each tenant in each predetermined time interval; the operation consumption calculator 503 for calculating consumption of each resource during each operation, based on a plurality of the total times and a plurality of the total consumption obtained within the period of time, and the resource usage calculator 504 for calculating each resource usage of each tenant within the period of time based on the calculated consumption of each resource during each operation and the total times of calling each operation of each tenant in each predetermined time interval.

In an embodiment, the operation tracker 502 may obtain the total times by performing the following operations: accessing a HTTP log; and determining the total times based on the information associated with calling each operation by the tenant in each predetermined time interval in the HTTP log. In another embodiment, the operation tracker 502 obtains the total times through performing the following operations: obtaining the tenant ID corresponding to an operation when the operation is about to start; and increasing the total times of calling the operation by the tenant during the predetermined time interval by 1.

For the concrete operations of the resource total consumption recorder 501, the operation tracker 502, the operation consumption calculator 503 and the resource usage calculator 504, please refer to the above detailed description of FIG. 2.

The system 500 shown in FIG. 5 may obtain usage of each resource of each tenant through statistics. Besides, FIG. 6 further shows a system for determining resource usage of each tenant according to another embodiment of the present invention.

As shown in FIG. 6, the system 600 includes: a resource total consumption recorder 601, an operation tracker 602, an operation consumption calculator 603, a resource usage calculator 604, a resource consumption proxy 605, a service event monitor 606, a resource usage determination device 607 and a mode selector 608.

In FIG. 6, the resource total consumption recorder 601 corresponds to the resource total consumption recorder 501 of FIG. 5; the operation tracker 602 corresponds to the operation tracker 502 in FIG. 5; the operation consumption calculator 603 corresponds to the operation consumption calculator 503; the resource usage calculator 604 corresponds to the resource usage calculator 504 of FIG. 5.

Besides, the resource consumption proxy 605 is for monitoring the consumption of each resource during each operation in an accurate mode, which can be implemented based on the prior art. In an embodiment, the resource consumption proxy 605 may include a resource consumption event monitor and a plurality of adapters corresponding to each resource. The resource consumption event monitor is for monitoring the resource consumption event, and when detecting the resource consumption event, it instructs the plurality of adapters to start measuring resource consumption of each resource, and when the resource consumption event ends, it instructs the plurality of adapters to take out the measured resource consumption value. The plurality of adapters respectively correspond to each resource, measure consumption of each resource with a measurement manner suitable for each resource, and may convert all resource consumptions into the same format.

Further, the service event monitor 606 is for in the accurate mode, obtaining the tenant ID corresponding to an operation when the operation is about to start, and establishing a mapping of consumption of the each resource during the operation to the tenant ID. The resource usage determination device 607 is for determining, in an accurate mode, usage of each resource of each tenant based on the mapping; and the mode selector 608 is for calculating the jitter of resource consumption and selecting whether to enable the accurate mode based on whether the jitter is greater than the predetermined threshold.

In an embodiment, the system 600 as shown in FIG. 6 may further include a threshold adjustor for setting the predetermined threshold based on historical resource consumption.

In another embodiment, the service event monitor 606 obtains the tenant ID through performing the following operations: when detecting a class file with boundary information written therein, obtaining the tenant ID from a configuration file or a predetermined memory location storing the tenant ID, wherein the class file is loaded when the operation is about to start.

In another embodiment, the system 600 further includes a resource consumption synthesizer for determining the comprehensive usage of each resource of each tenant within the period of time, based on the calculated usage of each resource of each tenant within the period of time, the usage of each resource of each tenant determined in the accurate mode, and the jitter.

For the concrete operations of the resource consumption proxy 605, the service event monitor 606, the resource usage determination device 607, the mode selector 608 as shown in FIG. 6 and the resource consumption synthesizer, please refer to the above description of the method of the present invention with reference to FIG. 4.

By virtue of the system 600 as shown in FIG. 6, when the resource jitter is great, it is determined to adopt the accurate mode, thereby obtaining a more accurate resource usage.

In another embodiment, the system 500 or 600 of the present invention may further include a tenant load balancer for implementing the tenant load balance based on one of the following: the calculated usage of each resource of each tenant within the period of time; the usage of each resource of each tenant determined in the accurate mode; and the comprehensive usage.

In a further embodiment, the system 500 or 600 of the present invention may further include a billing device for calculating fees charged to each tenant based on one of the following: the calculated usage of each resource of each tenant within the period of time; the usage of each resource of each tenant determined in the accurate mode; and the comprehensive usage.

Figure 7:
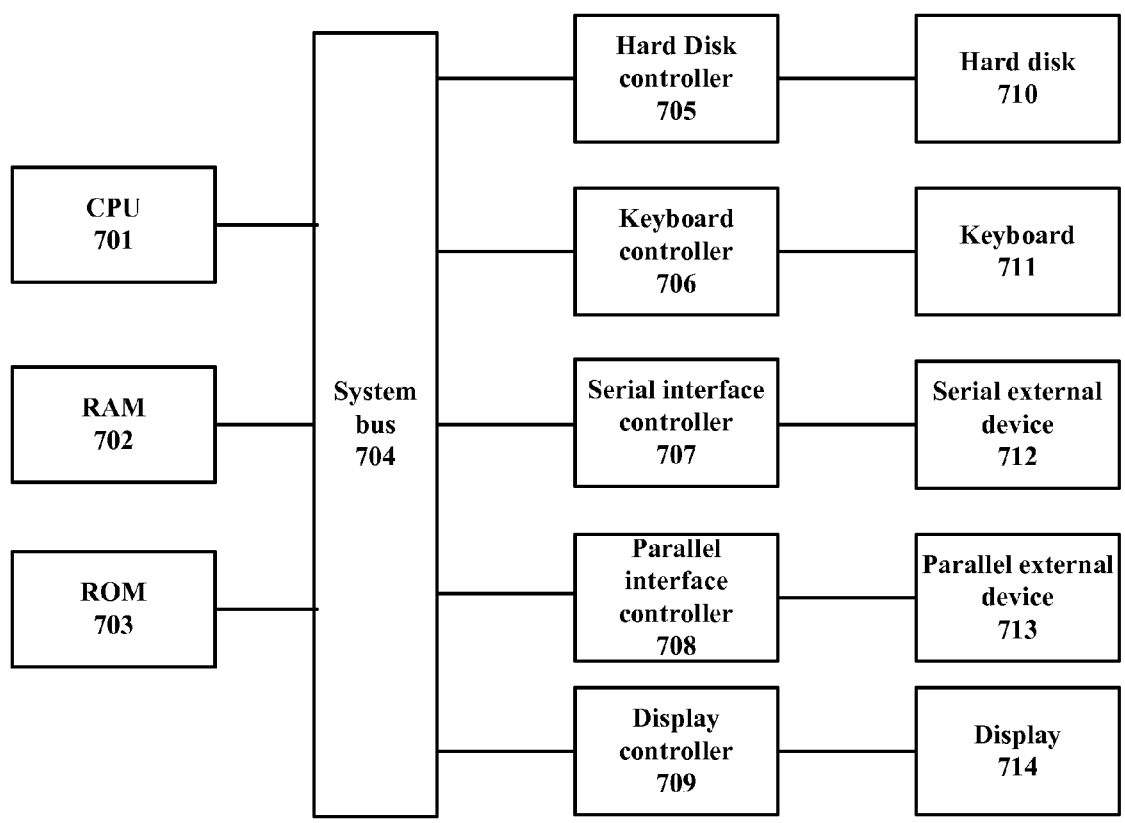
FIG. 7 schematically illustrates a structural block diagram of a computer device in which an embodiment according to the present invention can be implemented.

Referring to FIG. 7, a computer device in which the present invention can be implemented is described. FIG. 7 schematically illustrates a structural block diagram of a computer device in which an embodiment according to the present invention can be implemented.

The computer system as shown in FIG. 7 includes a CPU (Central Processing Unit) 701, a RAM (Random Access Memory) 702, a ROM (Read Only Memory) 703, a system bus 704, a hard disk controller 705, a keyboard controller 706, a serial interface controller 707, a parallel interface controller 708, a display controller 709, a hard disk 710, a keyboard 711, a serial peripheral device 712, a parallel peripheral device 713 and a display 714. Among these components, connected to the system bus 704 are the CPU 701, the RAM 702, the ROM 703, the hard disk controller 703, the keyboard controller 705, the keyboard controller 706, the serial interface controller 707, the parallel interface controller 708 and the display controller 709. The hard disk 710 is connected to the hard disk controller 705; the keyboard 711 is connected to the keyboard controller 706; the serial peripheral device 712 is connected to the serial interface controller 707; the parallel peripheral device 713 is connected to the parallel interface controller 708; and the display 714 is connected to the display controller 709.

The structural block diagram in FIG. 7 is shown only for illustration purpose, and is not intended to limit the present invention. In some cases, some devices can be added or reduced as required.

Further, the embodiments of the present invention can be implemented in software, hardware, or the combination thereof. The hardware part can be implemented by a special logic; the software part can be stored in a memory and executed by a proper instruction execution system such as a microprocessor or a dedicated designed hardware.

While the present invention has been described with reference to the preferred embodiments, it should be understood that the present invention is not limited to the embodiments disclosed herein. On the contrary, all modifications and equivalent arrangements that come within the spirit and range of the appended claims are intended to be embraced therein. The scope of the appended claims is accorded with the broadest interpretation to encompass all such modifications and equivalent structures and functions.

What is claimed is:

1. A computer implemented method for determining resource usage of a tenant in a multi-tenant architecture, comprising the steps of:

recording, using a computer device, within a period of time comprises an interval count of predetermined time intervals, a respective total consumption of each resource in each predetermined time interval;

obtaining, using the computer device, total times each operation is called by each tenant in each predetermined time interval, wherein each operation is executed a respective total number of times in each predetermined time interval, and wherein operations are called by at least a subset of tenants within a plurality of tenants within a multiple-tenant architecture;

calculating for each operation, using the computer device, a respective consumption of each resource during execution of the each operation, wherein the calculating the respective consumption of a respective resource within the each resource comprises solving a plurality of linear equations, each linear equation within the plurality of linear equations corresponding to a respective predetermined time interval within the interval count of predetermined time intervals, each linear equation comprising an equality between a respective total consumption of the respective resource during the respective predetermined time interval and a sum of a plurality of values, each value within the plurality of values representing a respective consumption of the respective resource during each respective execution of the respective operation; and calculating, using the computer device, usage of said each resource by at least one tenant within the period of time, based on the respective consumption of each resource during execution of each operation and the total times of calling each operation of each tenant in each predetermined time interval, thus determining resource usage for the at least one tenant.

2. The method according to claim 1, wherein the obtaining total times of calling each operation by each tenant in each predetermined time interval comprises:
   accessing Hypertext Transfer Protocol log; and
   determining the total times based on information associated with the tenant calling each operation in each predetermined time interval in the Hypertext Transfer Protocol log.

3. The method according to claim 1, wherein the obtaining total times of calling each operation by each tenant in each predetermined time interval comprises:
   obtaining a tenant identification corresponding to an operation when the operation is about to start; and
   increasing total times of calling the operation by the tenant in the predetermined time interval by 1.

4. The method according to claim 1, further comprising:
   determining a respective jitter value for each respective resource consumption over a plurality of predetermined time intervals, each respective jitter value reflecting a variation of values, over the plurality of predetermined time intervals, for each respective calculated resource consumption;
   determining, based upon the jitter value exceeding a predetermined threshold, to calculate the respective consumption for each resource using an accurate mode, wherein the accurate mode threshold comprises:
      obtaining the a tenant identification corresponding to an operation when the operation is about to start;
      monitoring consumption of each resource during the operation;
      establishing a mapping of consumption of the each resource during the operation to the tenant identification; and
      determining usage of each resource of each tenant based on the mapping.

5. The method according to claim 4, wherein the predetermined threshold is set based on historical resource consumption.

6. The method according to claim 4, wherein the step of obtaining the tenant identification corresponding to the operation comprises:
   loading a class file with boundary information written therein when the operation is about to start; and
   obtaining the tenant identification from a configuration file or a predetermined memory location storing the tenant identification when the class file with the boundary information written therein is detected.

7. The method according to claim 4, further comprising the step of: determining a comprehensive usage of each resource of each tenant within the period of time, based on the respective consumption of each resource of each tenant within the period of time, the respective consumption of each resource of each tenant determined in the accurate mode, and the jitter.

8. The method according to claim 7, further comprising the step of:
   performing tenant load balance based on at least one of the consumption of the respective consumption of each resource of each tenant within the period of time, the respective consumption of each resource of each tenant determined in the accurate mode, and the comprehensive usage.

9. The method according to claim 7, further comprising the step of:
   calculating fees charged to each tenant based on at least one of the respective consumption of each resource of each tenant within the period of time, the respective consumption of each resource of each tenant determined in the accurate mode, and the comprehensive usage.

10. The method according to claim 4, further comprising: determining, based upon the jitter value exceeding the predetermined threshold, to switch the calculation of the respective consumption of each resource between solving the plurality of linear equations and using the accurate mode.

11. The method according to claim 1, further comprising:
    setting, at a core level of a Java Virtual Machine executing the operation, a storage location configured to store a stored tenant ID; and
    writing, in response to receiving a service request for an operation, a requesting tenant ID into the storage location as the stored tenant ID,
    wherein the obtaining total times each operation is called by each tenant comprises obtaining the stored tenant ID from the storage location.

12. A system for determining resource usage of a tenant in a multi-tenant architecture, comprising:
    a processor;
    a memory, communicatively coupled to the processor;
    a resource total consumption recorder, communicatively coupled to the processor, configured to record, within a period of time comprising an interval count of predetermined time intervals, a respective total consumption of each resource in each predetermined time interval;
    an operation tracker, communicatively coupled to the processor, configured to obtain total times of calling each operation of each tenant in each predetermined time interval,
    wherein each operation is executed a respective total number of times in each predetermined time interval, and wherein operations are called by at least a subset of tenants within a plurality of tenants within a multiple-tenant architecture;
    an operation consumption calculator, communicatively coupled to the processor, configured to calculate for each operation a respective consumption of each resource during execution of the each operation,
    wherein the calculating the respective consumption of a respective resource within the each resource comprises solving a plurality of linear equations,
       each linear equation within the plurality of linear equations corresponding to a respective predetermined time interval within the interval count of predetermined time intervals,
       each linear equation comprising an equality between a respective total consumption of the respective resource during the respective predetermined time interval and a sum of a plurality of values, each value within the plurality of values representing a respective consumption of the respective resource during each respective execution of the respective; and
    a resource usage calculator, communicatively coupled to the processor, configured to calculate usage of each resource of at least one tenant within the period of time, based on the respective consumption of each resource during execution of each operation and the total times of calling each operation of each tenant in each predetermined time interval.

13. The system according to claim 12, wherein the operation tracker is further configured to:
    accessing means for accessing Hypertext Transfer Protocol log; and determining means for determining the total times based on information associated with each operation called by the tenant in each predetermined time interval in the Hypertext Transfer Protocol log.

14. The system according to claim 12, wherein the operation tracker further configured to:
    obtain a tenant identification corresponding to an operation when the operation is about to start; and
    increase total times of calling the operation of the tenant in the predetermined time interval by 1.

15. A system according to claim 12, further comprising:
    a mode selector, communicatively coupled to the processor, capable of configured to:
        determine a respective jitter value for each respective resource consumption over a plurality of predetermined time intervals, each respective jitter value reflecting a variation of values, over the plurality of predetermined time intervals, for each respective calculated resource consumption; and
        determine, based upon the jitter value exceeding a predetermined threshold, to calculate the respective consumption for each resource using an accurate mode;
    a resource consumption proxy, communicatively coupled to the processor, configured to monitor consumption of each resource during each operation in an the accurate mode;
    a service event monitor, communicatively coupled to the processor, configured to, in the accurate mode, obtain a tenant identification corresponding to an operation when the operation is to about start and establishing a mapping of consumption of the each resource during the operation to the tenant identification; and
    a resource usage determination device, communicatively coupled to the processor, configured to, determine, in the accurate mode, usage of each resource of each tenant based on the mapping.

16. The system according to claim 15, further comprising:
    a threshold adjustor, communicatively coupled to the processor, configured to set the predetermined threshold based on historical resource consumption.

17. The system according to claim 15, wherein the service event monitor further configured to:
    obtain the tenant identification from a configuration file or a predetermined memory location storing the tenant identification when a class file with boundary information written therein is detected,
    wherein the class file is loaded when the operation is about to start.

18. The system according to claim 15, further comprising:
    a resource consumption synthesizer, communicatively coupled to the processor, configured to determine comprehensive usage of each resource by each tenant within the period of time, based on the respective consumption of each resource by each tenant within the period of time, the usage of each resource of each tenant determined in the accurate mode, and the jitter.

19. The system according to claim 18, further comprising:
    a tenant load balancer, communicatively coupled to the processor, configured to perform tenant load balance based on one of the respective consumption of each resource by each tenant within the period of time, the respective consumption of each resource of each tenant determined in the accurate mode, and the comprehensive usage.

20. The system according to claim 18, further comprising:
    a billing device, communicatively coupled to the processor, configured to calculate fees charged to each tenant based on one of the consumption of each resource by each tenant within the period of time, the consumption of each resource of each tenant determined in the accurate mode, and the comprehensive usage.

* * * * *